United States Patent
Yagi

(10) Patent No.: US 9,733,636 B2
(45) Date of Patent: Aug. 15, 2017

(54) REMOTE UNIT AND ABNORMALITY DETERMINING METHOD THEREIN

(71) Applicant: Mitsubishi Electric Corporation, Tokyo (JP)

(72) Inventor: Takahiro Yagi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 76 days.

(21) Appl. No.: 14/891,385

(22) PCT Filed: Jun. 26, 2013

(86) PCT No.: PCT/JP2013/003983
§ 371 (c)(1),
(2) Date: Nov. 16, 2015

(87) PCT Pub. No.: WO2014/207781
PCT Pub. Date: Dec. 31, 2014

(65) Prior Publication Data
US 2016/0116895 A1  Apr. 28, 2016

(51) Int. Cl.
*G05B 9/02* (2006.01)
*G05B 19/05* (2006.01)

(52) U.S. Cl.
CPC .. *G05B 19/058* (2013.01); *G05B 2219/34475* (2013.01)

(58) Field of Classification Search
CPC .................................... G05B 19/058
USPC ....................................... 700/79
See application file for complete search history.

(56) References Cited

U.S. PATENT DOCUMENTS

| | | | |
|---|---|---|---|
| 2002/0193891 A1 | 12/2002 | Ushiku | |
| 2012/0044962 A1* | 2/2012 | Kobayashi | H01S 3/09702 372/29.02 |
| 2012/0254399 A1* | 10/2012 | Komeda | G06F 9/5083 709/224 |

(Continued)

FOREIGN PATENT DOCUMENTS

| | | |
|---|---|---|
| CN | 1379440 A | 11/2002 |
| CN | 102951512 A | 3/2013 |

(Continued)

OTHER PUBLICATIONS

Office Action dated Oct. 31, 2016, issued by the Korean Intellectual Property Office in counterpart Korean Application No. 10-2016-7001106.

(Continued)

*Primary Examiner* — Vincent Tran
(74) *Attorney, Agent, or Firm* — Sughrue Mion, PLLC; Richard C. Turner

(57) ABSTRACT

A remote unit (1) that controls a control target (4) on the basis of a command from a CPU unit (2) is provided with: an external input section (11) to receive a detection result of a state of the control target from a detection means (3) that detects the state of the control target; an output section (13) to output a control output for controlling the control target; and an abnormality determining section (12) to determine an abnormality of the control target on the basis of the detection result and to output to the output section, a control instruction to instruct a change or a stop of the control output if the control target is determined to be abnormal.

5 Claims, 2 Drawing Sheets

(56) References Cited

U.S. PATENT DOCUMENTS

| | | | | |
|---|---|---|---|---|
| 2013/0126492 A1* | 5/2013 | Mori | .................. | B23K 26/00 |
| | | | | 219/121.83 |
| 2013/0154538 A1* | 6/2013 | Ogawa | ............... | G05B 19/4062 |
| | | | | 318/565 |
| 2015/0153719 A1* | 6/2015 | Tsuda | .................. | G01M 13/00 |
| | | | | 700/193 |
| 2015/0220378 A1* | 8/2015 | Kanamaru | ............... | G05B 9/03 |
| | | | | 714/37 |

FOREIGN PATENT DOCUMENTS

| | | | |
|---|---|---|---|
| DE | 102012207215 A1 | 10/2013 | |
| EP | 2562614 A2 | 2/2013 | |
| JP | 04-109303 A | 4/1992 | |
| JP | 04-165401 A | 6/1992 | |
| JP | H05-225474 A | 9/1993 | |
| JP | 08-095624 A | 4/1996 | |
| JP | H09-129015 A | 5/1997 | |
| JP | 2001235148 A | 8/2001 | |
| JP | 2002-196801 A | 7/2002 | |
| JP | 2004-326562 A | 11/2004 | |
| JP | 2005-164500 A | 6/2005 | |
| JP | 2005-259077 A | 9/2005 | |
| JP | 2009-098735 A | 5/2009 | |
| JP | 2009-301418 A | 12/2009 | |
| TW | 201113657 A | 4/2011 | |

OTHER PUBLICATIONS

Office Action dated Oct. 10, 2016, issued by the State Intellectual Property of P.R. China in counterpart Chinese Application No. 201380077802.6.

Communication dated Oct. 28, 2016 issued by the German Patent and Trademark Office in counterpart German Patent Application No. 112013007195.9.

Japanese Office Action for Japanese Patent Application No. 2014-514996 issued on Jul. 15, 2014.

Examination Report of Corresponding Taiwan Patent Application No. 102125512 issued on Jan. 22, 2015.

Rejection Decision Letter of Corresponding Taiwan Patent Application No. 102125512 issued on Jun. 4, 2015.

International Search Report of PCT/JP2013/003983 dated Jul. 23, 2013 [PCT/ISA/210].

Communication dated May 5, 2017, issued by the State Intellectual Property Office of the People's Republic of China in counterpart Chinese Patent Application No. 201380077802.6.

* cited by examiner

REMOTE UNIT AND ABNORMALITY DETERMINING METHOD THEREIN

CROSS REFERENCE TO RELATED APPLICATIONS

This application is a National Stage of International Application No. PCT/JP2013/003983, filed Jun. 26, 2013, the contents of which are incorporated herein by reference in its entirety.

TECHNICAL FIELD

The invention relates to a remote unit (control device for distributed system) for a programmable logic controller, and particularly relates to control when an abnormality occurs.

BACKGROUND ART

In an analog output function of a remote unit for a programmable logic controller in a distributed control system, in order to change or stop an analog output of the remote unit by inputting a state of a control target (digital signal, analog input, etc. from sensor) to the remote unit and determining an abnormality of the control target from the state externally inputted, it has been necessary that a CPU unit of the programmable logic controller executes a control program such as a ladder program to monitor the state of the control target.

Therefore, a determining time for the CPU unit detecting the abnormality of the control target from the external input of the remote unit and output updating time for changing the analog output of the remote unit depend on the operating cycle of the CPU unit and the communication cycle between the CPU unit and the remote unit, and thus update of the analog output has been delayed owing to variations in the operating cycle and the communication cycle. Further, in a case where execution of the control program is stopped owing to failure of the CPU unit, it has been unable to detect the abnormality of the control target from the external input of the remote unit and then to change the analog output of the remote unit.

With regard to the problem, a technique has been proposed in which operation of the arithmetic unit in the programmable logic controller is monitored and the analog output is forcibly changed when failure of an arithmetic unit in the programmable logic controller is detected (for example, refer to Patent Document 1).

PRIOR ART DOCUMENT

Patent Document

Patent Document 1: Japanese Unexamined Patent Publication No. 2002-196801

SUMMARY OF THE INVENTION

Problems to be Solved by the Invention

However, according to the technique described in Patent Document 1, a condition for detecting the abnormality is limited to whether or not failure of the programmable logic controller occurs, and thus it has not been possible to determine the abnormality of the control target from the state of the external input and then to change the analog output when the programmable logic controller is failed.

The present invention has been made in consideration of the above described problem, and an object thereof is to realize a remote unit in which the abnormality of the control target can be detected from the state of the control target by the remote unit alone independent of the CPU unit of the programmable logic controller and the output to the control target can be changed or stopped.

Means for Solving the Problems

In order to overcome the problem described above, a remote unit according to the present invention controls a control target on the basis of a command from a CPU unit, and the remote unit is provided with: an external input section to receive one or more detection results of a state of the control target from a detection means that detects the state of the control target; an output section to output a control output for controlling the control target; and an abnormality determining section to determine one or more abnormalities of the control target on the basis of the detection results and to output to the output section, a control instruction to instruct a change or a stop of the control output if the control target is determined to be abnormal, wherein the external input section receives a plurality of detection results from the detection means, and then the abnormality determining section determines a plurality of abnormalities of the control target from a combination of the plurality of detection results and changes contents of the control instruction for each of the determined abnormalities, and if the abnormality determining section determines the control target to be abnormal, the output section changes or stops the control output on the basis of the control instruction to perform abnormality processing of the control target.

Effect of the Invention

According to the remote unit in the present invention, without depending on a command from a CPU unit, the remote unit detects an abnormality of the control target from an inputted state of the control target, to change or stop an output to a control target, so that the abnormality of the control target can be early detected and abnormality processing for the control target can be quickly performed without depending on the operating cycle of the CPU unit and the communication cycle of the remote unit.

Further, even in a case where the CPU unit cannot execute a control program owing to failure, etc., the abnormality processing for the control target can be performed.

MODES FOR CARRYING OUT THE INVENTION

Embodiment 1

In the following, a preferable embodiment of a remote unit according to the present invention will be described in detail. Note that, the invention is not limited by the embodiment.

Embodiment 1

Figure 1:
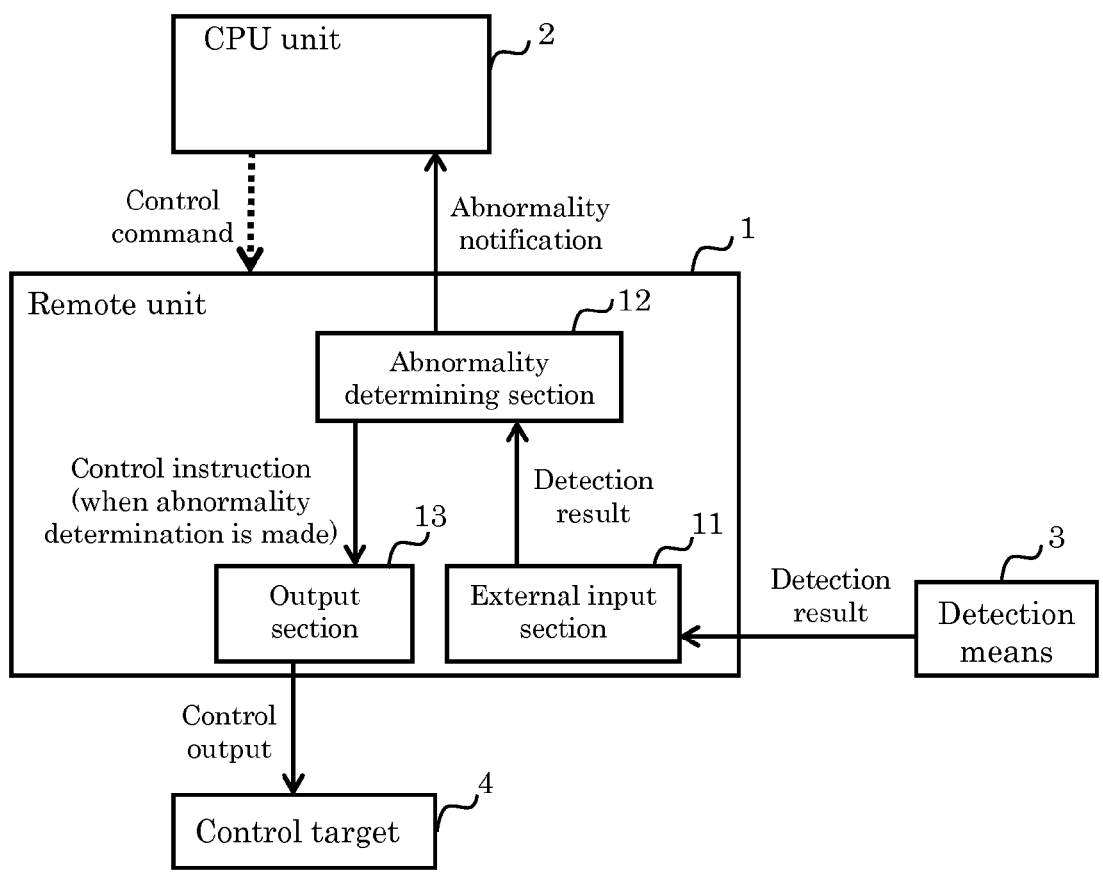
FIG. 1 is a diagram showing a configuration of a control system including a remote unit according to Embodiment 1 of the present invention.

FIG. 1 is a block diagram for explaining a control system of a programmable logic controller including a remote unit according to the present invention. As shown in the figure, a remote unit 1 that performs outputting (control output) for controlling a control target is connected, for example, via a network, etc., with a CPU unit 2 that controls an entire system including the control target by a control program (including a ladder program and a C language program, etc., but not limited thereto). The CPU unit 2 executes the control program and sends to the remote unit 1, a command (control command) indicating a change or a stop, etc. of the control output. Further, the remote unit 1 is connected with the control target 4 and outputs the control output to the control target 4 in accordance with the control command from the CPU unit 2. A motor used for conveyance, etc., or a valve used for plant facilities, etc., is given as an example of the control target 4.

The remote unit 1 is further connected with a detection means 3 that detects a state of the control target 4 and the detected result of the state of the control target 4 (detection result) is inputted thereto from the detection means 3. In addition, the remote unit 1 includes an external input section 11 to which the detection result are inputted, an abnormality determining section 12 that determines an abnormality of the control target 4 on the basis of the detection result inputted from the detection means 3, and an output section 13 that outputs a control output (for example, analog output) for controlling the control target 4.

The external input section 11 obtains the detection results of the state of the control target 4 as a digital signal or an analog input, etc. Further, the external input section 11 has a plurality of input ports, and thus a plurality of types of detection results can be inputted. The external input section 11 outputs to the abnormality determining section 12, the detection results inputted from the detection means 3 so as for the abnormality determining section 12 to determine the abnormality of the control target 4.

The abnormality determining section 12 selects detection results required for abnormality determination of the control target 4 out of the detection results inputted from the external input section 11, and determines the abnormality of the control target 4 on the basis of the selected detection result. The abnormality determination may be performed sequentially. Furthermore, a plurality of abnormalities may be determined using a plurality of detection results, or an abnormality may be determined using a combination of a plurality of detection results.

When determining the state of the control target 4 to be abnormal, the abnormality determining section 12 instructs the output section 13 to stop or change the control output (control instruction). For example, in a case where the control output is an analog output, the abnormality determining section 12 instructs the output section 13 to stop the analog output or change a value of the analog output. Note that, regarding the control instruction to the output section 13, the instruction to change the control output to an arbitrary value or to stop the control output can be given for each of determined abnormalities. In addition, regarding the control instruction to change or to stop the control output in the case where an abnormality is determined, the stop of the control output or the change in the control output to a predetermined value can be set for each determined abnormality by setting a parameter in advance.

When determining the state of the control target 4 to be abnormal, the abnormality determining section 12 may send to the CPU unit 2, abnormality notification indicating that an abnormality has occurred in the control target 4. When receiving the abnormality notification from the abnormality determining section 12, the CPU unit 2 performs, by the abnormality notification as a trigger, abnormality processing for the entire control system on the basis of the control program. Thus not only the remote unit 1 performs the abnormality processing for the control target 4 by the control output on the basis of its own abnormality determination, but also the CPU unit 2 can perform abnormality processing for the entire control system.

The output section 13 normally follows the control command that is inputted to the remote unit 1 and given by an execution of the control program (including a ladder program and a C language program, but not limited thereto) in the CPU unit 2, and then outputs the control output to the control target 4. Further, when the abnormality determining section 12 detects the abnormality of the control target 4, the output section 13 follows the control instruction received from the abnormality determining section 12 and changes or stops the control output. For example, in a case where the control output is an analog output, the output section 13 stops the analog output or changes a value of the analog output.

Note that, in addition to detecting the state of the control target 4 and outputting the state to the external input section 11, the detection means 3 may detect the abnormality of the control target 4 and output to the external input section 11, the fact that an abnormality has been detected as a detection result as well, or output to the external input section 11, only the result of detecting the abnormality as a detection result. The detection result of the abnormality may be inputted to the external input section 11 as a value of a digital signal or an analog input, etc.

Further, when the detection result of the abnormality detection is inputted from the detection means 3, the abnormality determining section 12 may use the detection result in determining the abnormality in the state of the control target 4. In addition, when determining the state of the control target 4 to be abnormal, the abnormality determining section 12 may send to the output section 13 a control instruction to hold a value of the control output, depending on contents of the determined abnormality.

Figure 2:
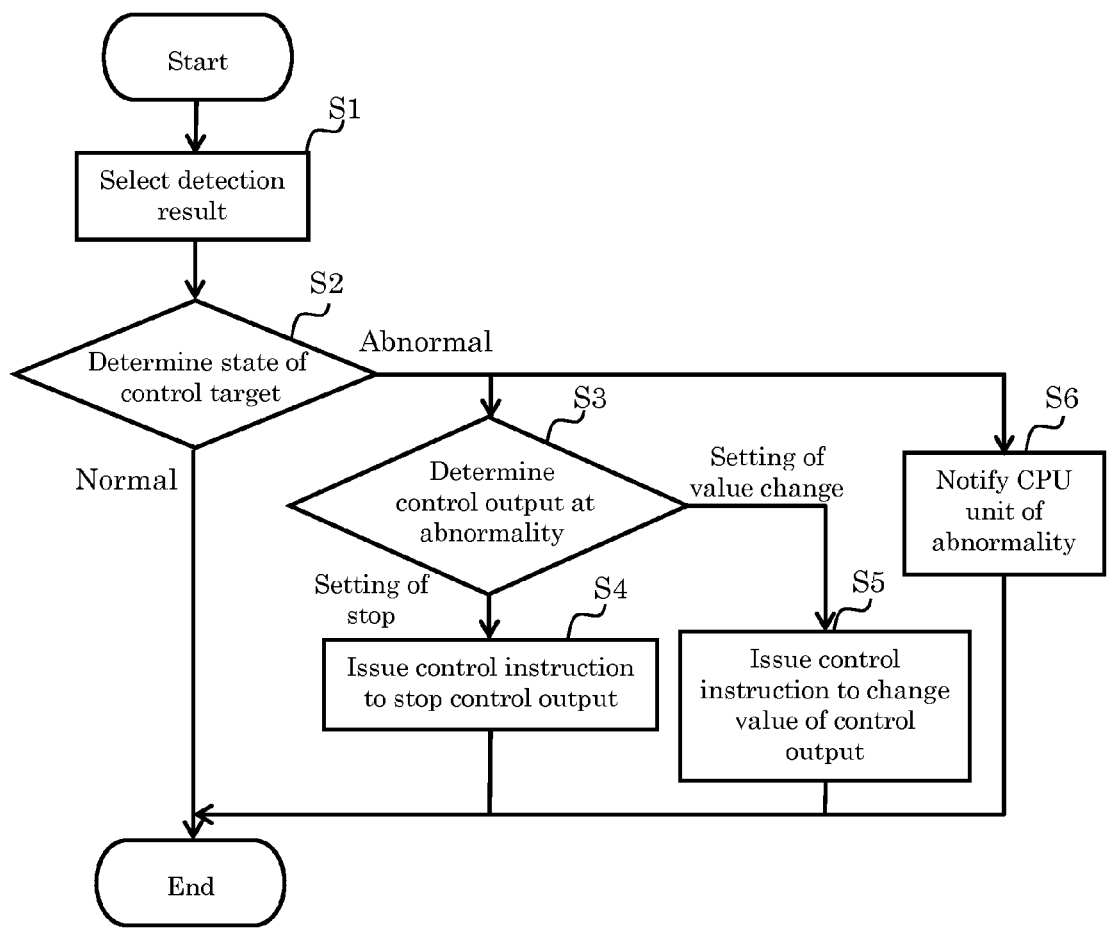
FIG. 2 is a flowchart for explaining operation of abnormality determining processing in the remote unit according to Embodiment 1 of the present invention.

Next, abnormality determining processing of the remote unit will be described with reference to FIG. 2. FIG. 2 is a flowchart for explaining processing operation in determining the abnormality of the control target 4 from the detection result of the detection means 3.

As shown in FIG. 2, the abnormality determining section 12 selects a detection result required for the abnormality determination of the control target 4 out of the detection results inputted from the external input section 11 (Step S1).

After the processing of Step S1, whether the state of the control target 4 is normal or abnormal is determined on the basis of the selected detection result (Step S2). Note that the determination in Step S2 may be made using not only a detection result, but also a combination of a plurality of detection results. In Step S2, if the state of the control target 4 is normal on the basis of the detection results obtained in Step S1, the processing proceeds to the end. If the state of the control target 4 is abnormal on the basis of the detection result obtained in Step S1, the processing proceeds to Step S3 in which a control output at an abnormality is set, and Step S6 is also performed in which abnormality notification is sent to the CPU unit 2.

If the state of the control target 4 is determined to be abnormal in Step S2, whether the control output is to be stopped or the control output value is to be changed is determined in order to decide contents of the control output (Step S3).

If the control output is determined to be stopped in Step S3, a control instruction to stop the control output is issued to the output section 13 (Step S4). For example, if a parameter set for the control output (for example, analog output) at an abnormality has been set to the stop, a control instruction to change the control output (analog output) to the value for the stop is issued.

If the value of the control output is determined to be changed in Step S3, a control instruction to change the value of the control output is issued to the output section 13 (Step S5). For example, if a parameter set for the control output (for example, analog output) at an abnormality has been set to change the value, a control instruction to change the control output (analog output) to a predetermined value is issued.

If the state of the control target 4 is determined to be abnormal in Step S2, the processing proceeds to Step S3. In addition, abnormality notification is sent to the CPU unit 2 in order to notify the CPU unit 2 of occurrence of the abnormality of the control target 4 (Step S6).

Note that the abnormality determining section 12 may sequentially execute the operation from Step S1 through S6 of the abnormality determining processing to constantly monitor abnormality of the control target 4.

As stated above, according to the embodiment of the present invention, an abnormality of the control target is determined by the remote unit alone independent of the CPU unit, so that an abnormality can be early detected, the control output can be early stopped or changed in accordance with a state of the control target at an abnormality, and abnormality processing can be performed.

Further, the remote unit notifies the CPU unit of an abnormality of the control target, so that abnormality processing for the entire control system can be performed.

Furthermore, the remote unit determines a plurality of abnormalities using a plurality of detection results or an abnormality of the control target using a combination of a plurality of detection results, and thereby the change or the stop of the control output is instructed for each of the determined abnormalities, so that abnormality processing for the control target can be properly performed in accordance with a state of an abnormality.

Still further, parameters are set in advance as to whether an instruction to change the control output to a predetermined value is issued or an instruction to stop the control output is issued for the case where the state of the control target is determined to be abnormal, so that the control output can be early made to the control target and abnormality processing for the control target can be quickly performed.

INDUSTRIAL APPLICABILITY

As stated above, the remote unit according to the present invention is suitable for a distributed control system for a programmable logic controller.

EXPLANATION OF REFERENCE NUMERALS 1 remote unit
2 CPU unit
3 detection means
4 control target
11 external input section
12 abnormality determining section
13 output section

The invention claimed is:

1. A remote unit that controls a control target on the basis of a command from a CPU unit, the remote unit comprising:
an external input section to receive one or more detection results of a state of the control target from a detection means that detects the state of the control target;
an output section to output a control output for controlling the control target; and
an abnormality determining section to determine one or more abnormalities of the control target on the basis of the detection results and to output to the output section, a control instruction to instruct a change or a stop of the control output if the control target is determined to be abnormal, wherein
the external input section receives a plurality of detection results from the detection means, and then the abnormality determining section determines a plurality of abnormalities of the control target from a combination of the plurality of detection results and changes contents of the control instruction for each of the determined abnormalities, and
if the abnormality determining section determines the control target to be abnormal, the output section changes or stops the control output on the basis of the control instruction to perform abnormality processing of the control target.

2. The remote unit according to claim 1, wherein the abnormality determining section further outputs to the CPU unit, abnormality notification indicating that an abnormality has occurred in the control target.

3. The remote unit according to claim 2, wherein the abnormality determining section sets in advance whether a control instruction to change the control output to a predetermined value is issued or a control instruction to stop the control output is issued for the case where the state of the control target is determined to be abnormal.

4. The remote unit according to claim 1, wherein the abnormality determining section sets in advance whether a control instruction to change the control output to a predetermined value is issued or a control instruction to stop the control output is issued for the case where the state of the control target is determined to be abnormal.

5. A method of determining an abnormality of a control target by a remote unit that includes an external input section to receive a plurality of detection results of a state of the control target from a detection means that detects the state of the control target, includes an output section to output a control output for controlling the control target, and controls the control target on the basis of a control command from a CPU unit, the method comprising:
a first step of selecting a detection results required for an abnormality determination of the control target from the plurality of detection results inputted to the external input section;
a second step of determining a plurality of abnormalities of the control target from a combination of the detection results selected in the first step;
a third step of determining, for each of the plurality of determined abnormalities, whether a control instruction to stop the control output is issued or a control instruction to change a value of the control output is issued, if the state of the control target is determined to be abnormal in the second step;

a fourth step of issuing a control instruction to the output section to stop the control output if the stop of the control output is determined in the third step;

a fifth step of issuing a control instruction to the output section to change the value of the control output if the change in the value of the control output is determined in the third step; and a sixth step of proceeding to the third step and also sending to the CPU unit an abnormality notification indicating that an abnormality has occurred in the control target, if the state of the control target is determined to be abnormal in the second step.

\* \* \* \* \*